United States Patent [19]
Gifford et al.

[11] Patent Number: 4,758,414
[45] Date of Patent: Jul. 19, 1988

[54] IRON OR ALUMINUM PRECIPITATION IN STRONG ACID SYSTEMS

[75] Inventors: Dennis R. Gifford, West Columbia; Marvin L. Dettloff, Lake Jackson, both of Tex.

[73] Assignee: The Dow Chemical Company, Midland, Mich.

[21] Appl. No.: 67,914

[22] Filed: Jun. 30, 1987

[51] Int. Cl.$^4$ .............................................. C22B 21/00
[52] U.S. Cl. ...................................... 423/122; 423/140; 423/DIG. 2; 75/108; 210/702; 210/729; 210/735
[58] Field of Search ................. 423/122, 140, DIG. 2; 75/108; 210/702, 729, 735

[56] References Cited

U.S. PATENT DOCUMENTS

| | | | |
|---|---|---|---|
| 2,038,078 | 4/1936 | Hardiek | 423/DIG. 2 |
| 2,726,953 | 12/1955 | Roy et al. | 423/140 |
| 3,288,846 | 11/1966 | Irani et al. | 252/DIG. 11 |
| 3,306,702 | 2/1967 | Odland et al. | 423/DIG. 2 |
| 3,779,912 | 12/1973 | Redmore et al. | 210/735 |

OTHER PUBLICATIONS

Chem. Abst. 84:83673e.
Chem. Abst. 101:178453s.
Chem. Abst. 100:195666.
Chem. Abst. 102(18):159728q.
"Comparison of the Metal-Binding Properties of Nitrilotri(methylenephosphonic) Acid and Nitrilotriacetic Acid: Calcium (II), Nickel (II), Iron (III), and Thorium (IV) Complexes", Analytical Chemistry by H. S. Hendrickson, pp. 998-1000; vol. 39, No. 8, 1967.

Primary Examiner—Patrick P. Garvin
Assistant Examiner—Paige C. Harvey
Attorney, Agent, or Firm—A. Cooper Ancona

[57] ABSTRACT

The precipitation of iron and aluminum from their solutions in strong acids, eg. 18% HCl and 25% $H_2SO_4$, is accomplished by adding to the acid solution certain organic aminophosphonic acids in which at least 50% of the amine hydrogens have been substituted with methylenephosphonic acid groups. Particularly preferred compounds are the methylenephosphonic acid derivatives of ammonia and polyalkylenepolyaminepoly(methylenephosphonic acids). The completely phosphonomethylated derivatives are most preferred.

25 Claims, No Drawings

IRON OR ALUMINUM PRECIPITATION IN STRONG ACID SYSTEMS

BACKGROUND OF THE INVENTION

Strong acids such as hydrochloric and sulfuric are commonly used in many industrial processes in which during use various metal ions are picked up by the acid. In subsequent use or recycling to the process the presence of such metal ions is undesirable and it becomes necessary to remove these ions from the acid solution. While it is possible to do this in dilute acid systems, it is much more difficult to precipitate the metal ions from strong acids, eg. >2M.

In a particular application, 28% HCl is employed in the acidizing of oil wells. To improve the efficacy of the acid treatment surfactants are frequently added to the acidizing solution. If there is too much iron in the system, the surfactants have the tendency to form a separate phase. In order to overcome this tendency, the concentration of iron must be reduced or it must be removed completely.

Aluminum is another metal which can cause problems in certain processes and it, too, must be removed. In a particular application both iron and aluminum are dissolved by 25% sulfuric acid which interferes with the process in which the acid is used. These ions, therefore, must be removed before recycling the acid to the process.

While certain metals, eg. lanthanum, have been complexed with some aminophosphonic acids, eg. nitrilotri(methylenephosponic acid) (NTMP) and precipitated from dilute acid solutions, the precipitate dissolves in stronger acid solutions (see Chem. Abst. 102(18): 159728Q). In another reference (Anal. Chem. vol. 39, no. 8, 1967, pp 998–1000.) ferric iron was precipitated in acid solution with NTMP at a pH of 2.5, but was redissolved at pH of >4. The use of NTMP to precipitate aluminum is accomplished in 0.1M HCl, in combination with diethylenetriaminepentaacetic acid to prevent the co-precipitation of transition metals. This is reported in Chem. Abst. 84:83673e. Another study, reported in Chem. Abst. 101:178453s, covers the solubility of the aluminum subgroup of metals with certain organophosphorous complexing agents, including NTMP and ethylenediaminetetra(methylenephosphonic acid) (EDTMP) in solutions of $H_2SO_4$ of up to 0.25M. The precipitation of Indium from 0.1M $H_2SO_4$ by using p-hydroxybenzyl-amine-N,N-bis(methylenephosphonic acid) is disclosed in Chem Abst. 100:195666.

It has now been found that certain organic aminophosphonic acid compounds will cause iron and aluminum to precipitate from acid solutions of >2M.

SUMMARY OF THE INVENTION

Organic aminophosphonic acids in which at least 50% of the amine hydrogens have been substituted with methylenephosphonic acid groups have been found useful for precipitating iron and aluminum ions from strong acid solutions, eg. 18% HCl and 25% $H_2SO_4$. Particularly preferred compounds are the methylenephosphonic acid derivatives of ammonia and polyethylenepolyaminepoly(methylenephosphonic acids). The completely phosphonomethylated derivatives are most preferred.

DETAILED DESCRIPTION OF THE INVENTION

The organic aminophosphonic acids which are useful in precipitating iron and aluminum from strong acid solutions are those having the formula

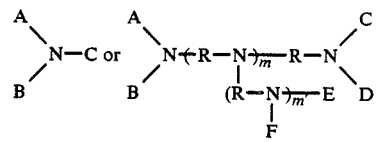

wherein substituents A, B, C, D, E and F are independently selected from hydrogen, —$CH_2COOH$, —$CH_2PO_3H_2$, and —$CH_2SO_3H$, groups and salts of the acid radicals wherein m and m' each is 0–2500, with the proviso that at least about 50 percent of the amine hydrogens have been substituted by the methylenephosphonic acid group and wherein R is a hydrocarbon residue which can be a linear, branched, cyclic, heterocyclic, substituted heterocyclic, or a fused ring-type structure; with the further proviso that when m or m'≧1, the E and F substituents may be the same as or different from any other substituent of any other nitrogen atom and each R can be the same as or different from any other R.

The compounds can be prepared by a number of known synthetic techniques. Of particular importance is the reaction of compounds containing reactive amine hydrogens with a carbonyl compound (aldehyde or ketone) and phosphorous acid or a derivative thereof. Detailed procedures can be found in U.S. Pat. No. 3,288,846.

Compounds which have been found useful in obtaining the precipitation of metal ions in strong acid solutions include nitrilotri(methylenephosphonic acid) (NTMP), polyethylenepolyaminophosphonic acids, e.g. ethylenediaminetetra(methylenephosphonic acid), diethylenetriaminepenta(methylenephosphonic acid) (DTPMP), triethylenetetraminehexa(methylenephosphonic acid), tetraethylenepentaminehepta(methylenephosphonic acid); also certain cyclic nitrogen compounds such as aminoethylpiperazinetri(methylenephosphonic acid), bis(3-aminopropyl)piperazinetetra(methylenephosphonic acid); other alpha,omega-diaminephosphoic acids such as 1,6-hexanediaminetetra(methylenephosphonic acid); longer chain polyalkylenepolyaminepoly(methylenephosphonic acids), such as Ethyleneamine E-100*, which have been fully phosphonomethylated.

*Tradename of a product (a mixture of pentaethylenehexamine plus heavier polyamines, Mw=250-300) sold by The Dow Chemical Company.

The following procedure is representative of the test procedure used to determine the efficacy of any particular aminophosphonic acid in the precipitation of metals from strong acid solutions:

REPRESENTATIVE EXAMPLE

A stock solution of a metal ion, e.g. iron or aluminum, is prepared in a particular acid, e.g. $H_2SO_4$ or HCl. Usually the concentration of metal ion is about 1000 ppm. Then a stock solution of the aminophosphonic acid chelant, or ligand (L), is prepared in the same acid in which it is to be tested. The concentration of the complexing agent, or chelant, is usually from about 0.0025 to about 0.02 g of active compound per gram of acid solution.

A given amount of the chelating solution is then added to the same volume of the acid solution containing the metal ion. The solution is stirred, then allowed to stand for at least about 5 minutes. The character and amount of precipitate (ppt) are observed and recorded. The amount of metal ion remaining in solution is determined by atomic absorption spectra and the percent metal removed calculated by difference. The results of iron recovery from 25% $H_2SO_4$ are shown as Examples 1-7 in Table I.

The ligands tested included partially and fully methylenephosphonated diethylenetriamine. In Table I the methylenephosphonated diethylenetriamines are represented by DT-4-MP, DT-3-MP and DT-2-MP which are partially phosphonomethylated diethylenetriamines containing an average of 4, 3 and 2 moles of methylenephosphonic acid groups, respectively. The fully methylenephosphonated diethylenetriamine is represented as DTPMP. E-100-PMP is the fully phosphonomethylated E-100, previously defined. PAPA-PMP is the completely phosphonomethylated reaction product of 1,2-dichloroethane with E-100 (sold under the trademark Purifloc C-31 by The Dow Chemical Company). The integers in the formula indicated above corresponding to m and m' are such as to provide a polyamine product (PAPA) having an average molecular weight of from about 10,000 to 30,000.

TABLE I

| Ex. No. | Additive (L)* | Wt. Ratio (L/Fe) | Observed Ppt. | % Fe Removed |
|---|---|---|---|---|
| 1 | NTMP | 5 | White | 90 |
| 2 | DTPMP | 5 | same | 90 |
| 2a | same | 20 | same | 95 |
| 3 | DT-4-MP | 5 | same | 97 |
| 3a | same | 20 | same | 97 |
| 4 | DT-3-MP | 2.5 | same | 69 |
| 4a | same | 5 | same | 96 |
| 5 | DT-2-MP | 5 | same | 83 |
| 5a | same | 10 | same | 92 |
| 6 | E-100-PMP | 2.5 | same | 68 |
| 6a | same | 5 | same | 97 |
| 7 | PAPA-PMP | 2.5 | same | 45 |
| 7a | same | 10 | same | 98 |

*L = represents a particular ligand.

Certain other amine compounds which have been phosphonomethylated are tested which do not precipitate the iron in the 25% $H_2SO_4$ system. Included are phosphonomethylated hydroxyalkylamines, e.g. hydroxyethylnitrodi(methylenephosphonic acid) and hydroxyethylethylenediaminetri(methylenephosphonic acid). Also included among those which will not precipitate these metals from strong acids is diaminocyclohexanetetra(methylenephosphonic acid).

In another series of experiments iron is removed from a solution of 18% HCl according to the procedure of the Representative Example above. The useful ratio of ligand to iron is from about 50/1 to about 5/1 and preferably from about 30/1 to about 10/1. The result of the experiments on removing iron from HCl is shown as Examples 8-10 in Table II.

TABLE II

| Ex. No. | Additive (L) | Wt. Ratio (L/Fe) | Observed Ppt. | % Fe Removed |
|---|---|---|---|---|
| 8 | NTMP | 10 | White | 94 |
| 9 | E-100-PMP | 10 | " | 91 |
| 10 | PAPA-PMP | 28 | " | 99+ |

The iron is not precipitated from a solution of 18% HCl by either the addition of hydroxyethylnitrilodi(methylenephosphonic acid) or hydroxyethylethylenediaminetri(methylenephosphonic acid). Apparently, hydroxyalkyl-substituted amines do not have the properties desired for precipitating metals from strong acid solutions.

In other experiments aluminum is precipitated from sulfuric acid using various phosphonomethylated amines. The percent which precipitates will depend on the amount of aluminum present and the particular ligand employed. Some of the aluminum complexes which form are soluble at low levels of aluminum, but at higher amounts of aluminum a large portion of the aluminum complex precipitates. The ratios of ligand to aluminum are preferably above about 5/1, but this depends on the particular complexing agent employed and on the concentration of the aluminum in solution. Low concentrations of aluminum will not precipitate, but concentrations above about 800 ppm. will produce the desired result. The phosphonomethylated Ethyleneamine E-100 precipitates aluminum from 25% $H_2SO_4$ although the white precipitate forms slowly.

We claim:

1. A process for precipitating iron or aluminum from a strong acid solution containing same, said strong acid solution being >2M, which comprises adding to said solution a phosphonomethylated amine having the formula

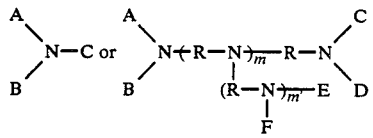

wherein substituents A, B, C, D, E and F are independently selected from hydrogen, —$CH_2COOH$, —$CH_2PO_3H_2$, and —$CH_2SO_3H$, groups and salts of the acid radicals wherein m and m' each is 0-2500 and wherein R is a hydrocarbon residue which can be linear, branched, cyclic, heterocyclic, substituted heterocyclic, or a fused ring-type structure; with the further proviso that when m or m'≧1, the E and F substituents may be the same as or different from any other substituent on the same or any other nitrogen atom and each R can be the same as or different from any other R and in which at least 50% of the amine hydrogens have been substituted with methylenephosphonic acid groups.

2. The process of claim 1 wherein the substituent groups are selected from hydrogen and —$CH_2PO_3H_2$.

3. The process of claim 2 wherein the phosphonomethylated amine is nitrilotri(methylenephosphonic acid).

4. The process of claim 2 wherein m is 1 and m' is 0.

5. The process of claim 4 wherein the phosphonomethylated amine is a phosphonomethylated diethylenetriamine.

6. The process of claim 5 wherein all substituent groups are —$CH_2PO_3H_2$.

7. The process of claim 1 wherein m and m' are integers such as to provide a polamine precursor having an average molecular weight of from about 250 to about 300.

8. The process of claim 7 wherein the substituent groups are selected from hydrogen and —$CH_2PO_3H_2$.

9. The process of claim 1 wherein m and m' are integers such as to provide a polamine precursor having an average molecular weight of from about 10,000 to about 30,000.

10. The process of claim 9 wherein the substituent groups are selected from hydrogen and —$CH_2PO_3H_2$.

11. The process of claim 2 wherein the metal ion being precipitated is iron.

12. The process of claim 5 wherein the metal ion being precipitated is iron.

13. The process of claim 1 wherein the strong acid solution is $H_2SO_4$ or HCl.

14. The process of claim 3 wherein the strong acid solution is $H_2SO_4$ or HCl.

15. The process of claim 4 wherein the strong acid solution is $H_2SO_4$.

16. The process of claim 11 wherein the ratio of phosphonomethylated amine to iron is from about 5/1 to about 50/1.

17. The process of claim 13 wherein the ratio of phosphonomethylated amine to iron is from about 5/1 to about 50/1.

18. The process of claim 16 wherein the ratio of phosphonomethylated amine to iron is from about 10/1 to about 30/1.

19. The process of claim 17 wherein the ratio of phosphonomethylated amine to iron is from about 10/1 to about 30/1.

20. The process of claim 8 wherein the phosphonomethylated amine to metal ratio is from about 5/1 to about 20/1.

21. The process of claim 10 wherein phosphonomethylated amine to metal ratio is from about 10/1 to about 30/1.

22. The process of claim 20 wherein the metal is iron.

23. The process of claim 20 wherein the metal is aluminum and is present at a concentration of about >800 ppm.

24. The process of claim 21 wherein the metal is iron.

25. The process of claim 21 wherein the metal is aluminum and is present at a concentration of about >800 ppm.

* * * * *